June 12, 1934.　　　　E. H. LICHTENBERG　　　1,962,960
TANDEM MIXER BATCHMETER AND TIMING GEAR CONTROL
Filed Feb. 21, 1931　　　4 Sheets-Sheet 1
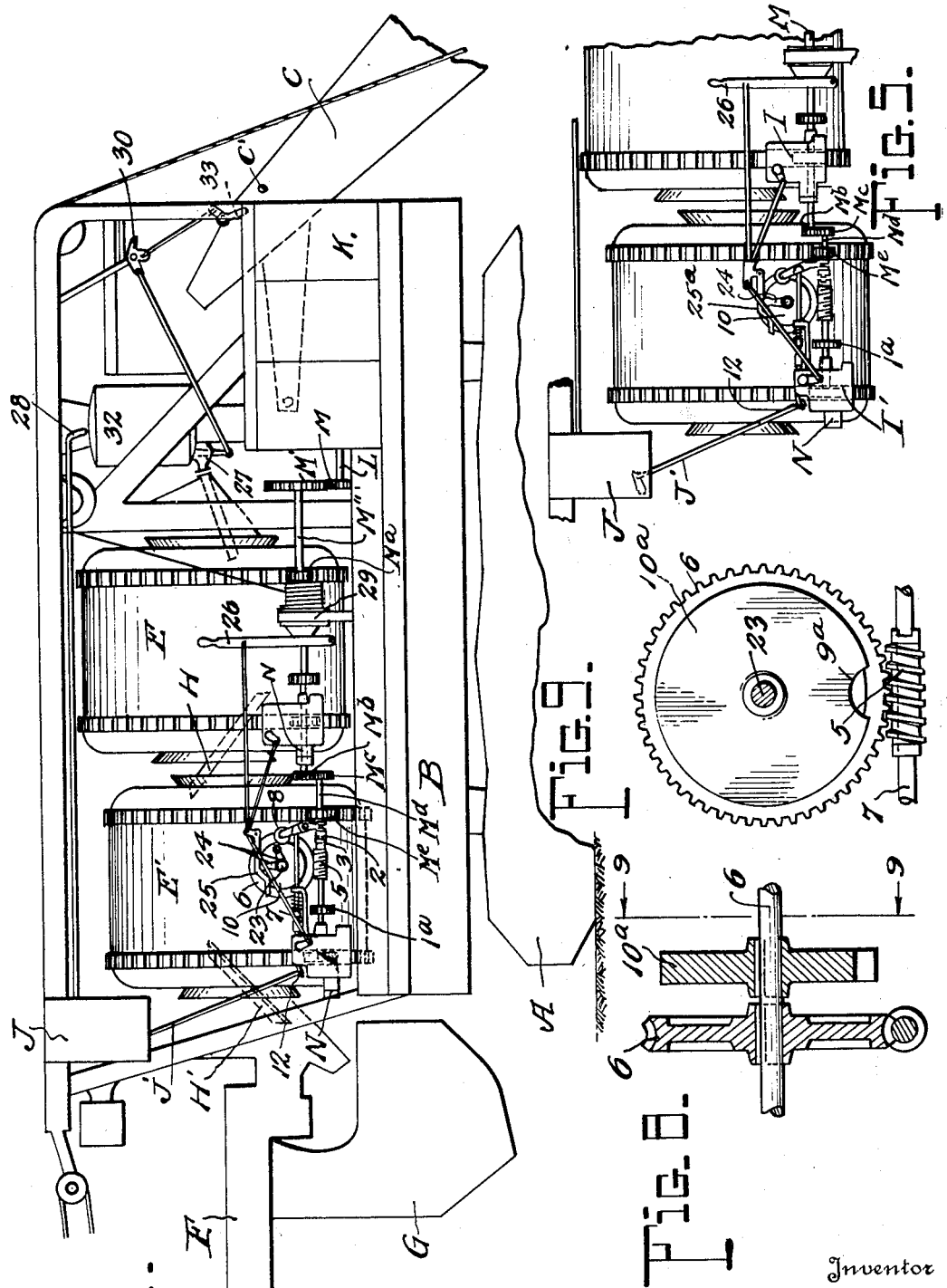
Inventor
E. H. LICHTENBERG.
By Robert Robb
Attorneys June 12, 1934.  E. H. LICHTENBERG  1,962,060
TANDEM MIXER BATCHMETER AND TIMING GEAR CONTROL
Filed Feb. 21, 1931  4 Sheets-Sheet 2
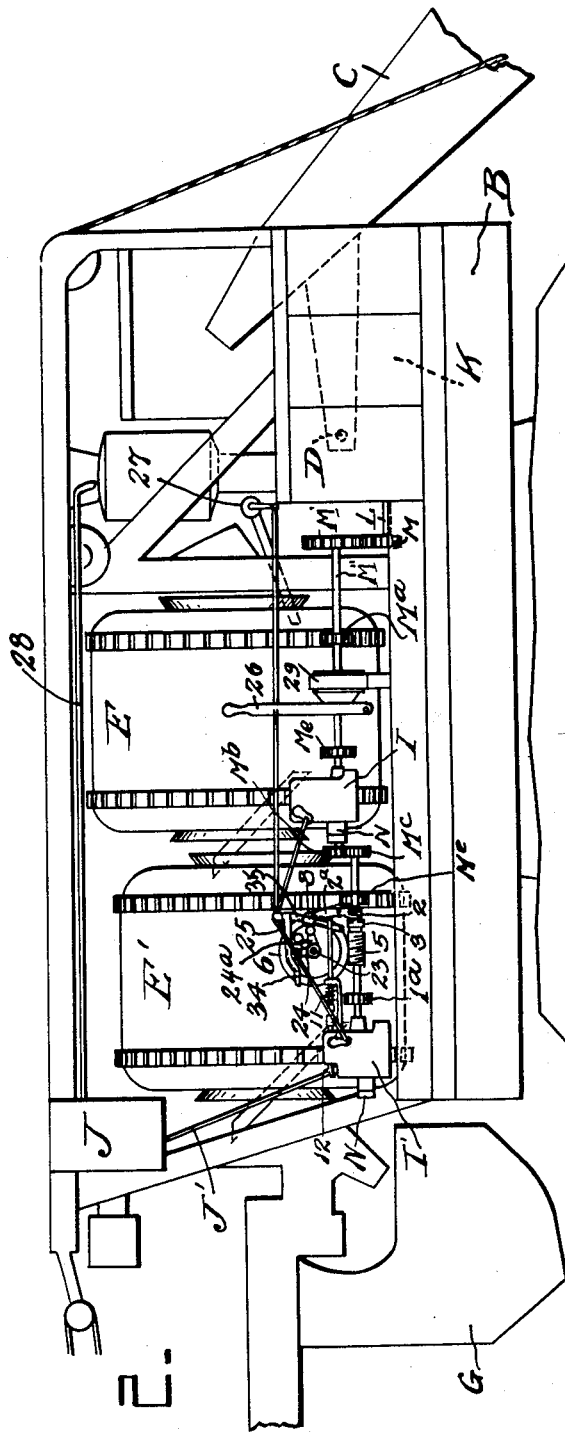
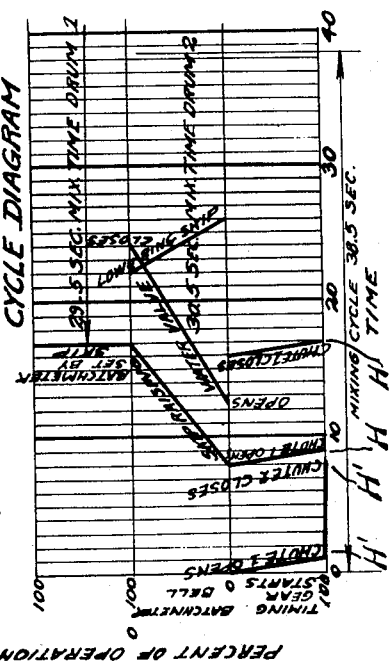
Inventor
E. H. LICHTENBERG.
By Robert Cobb
Attorneys

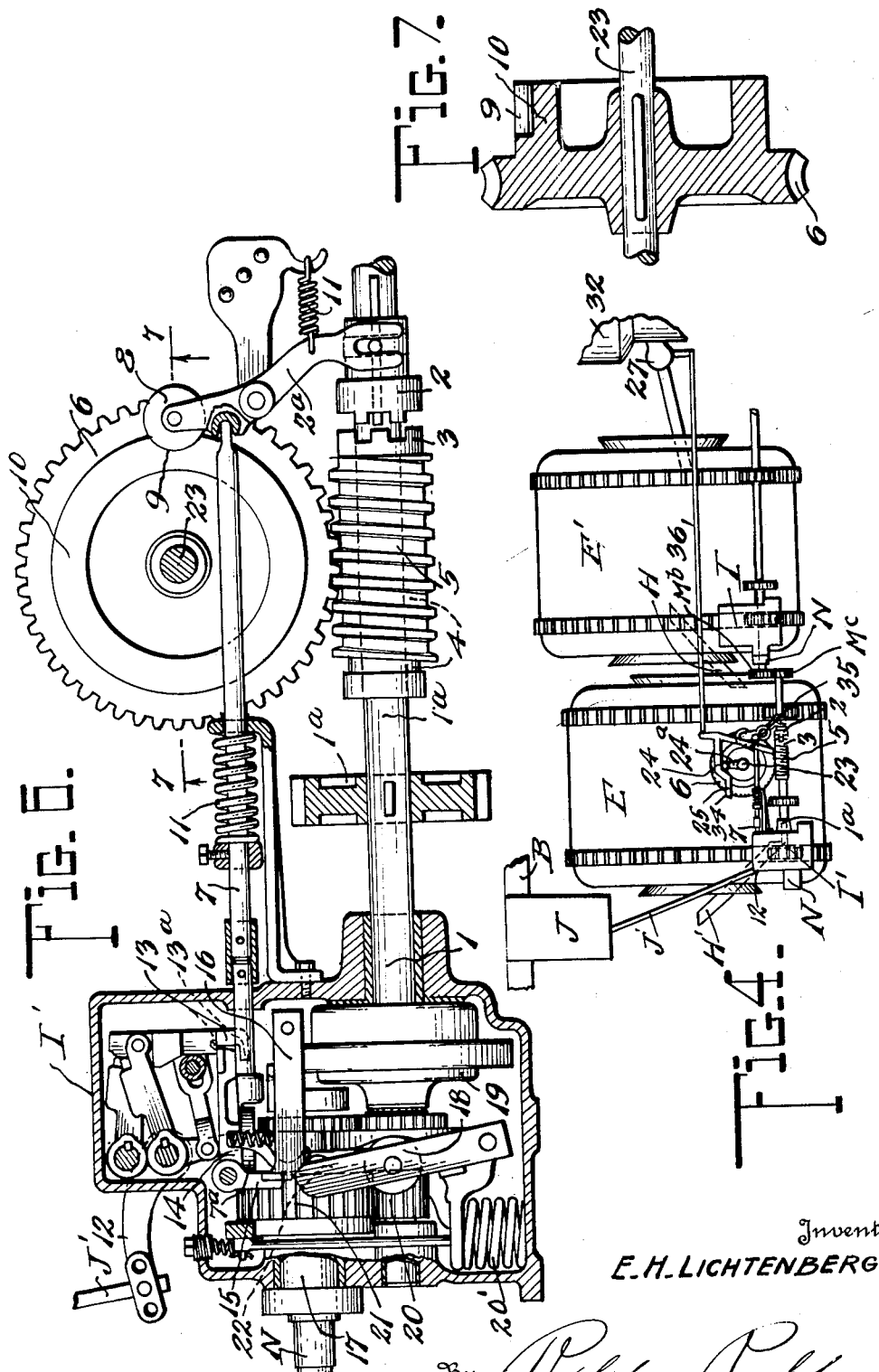

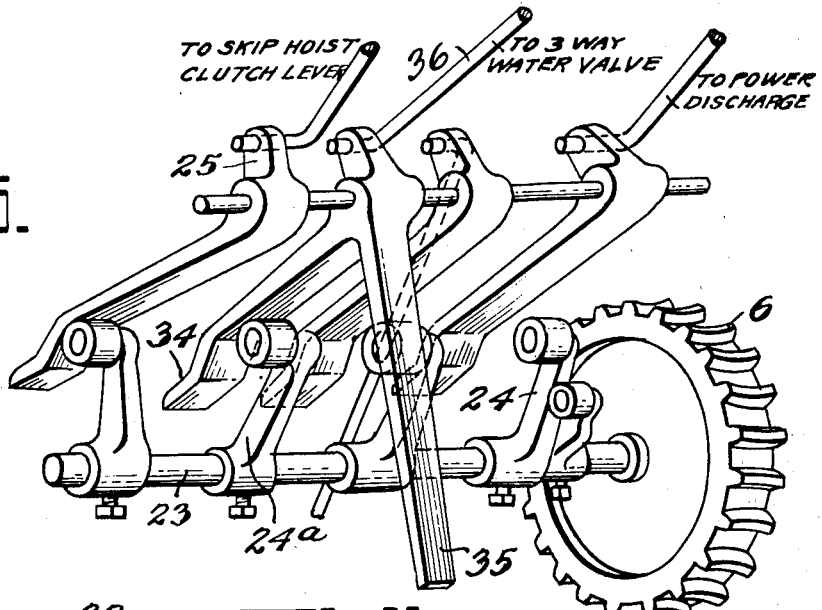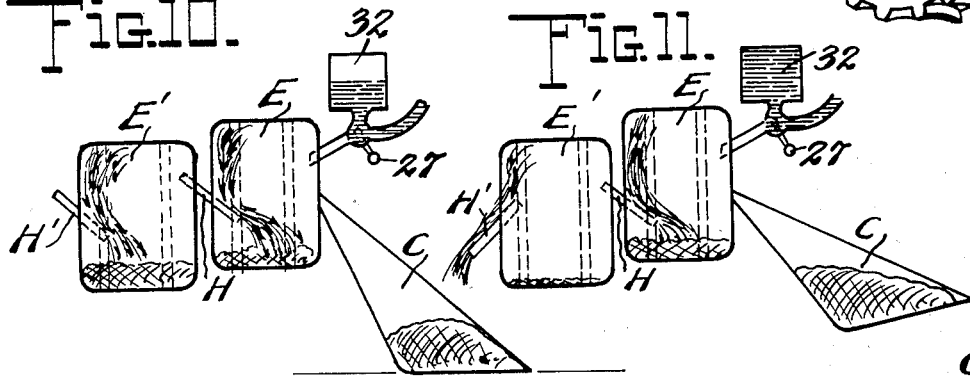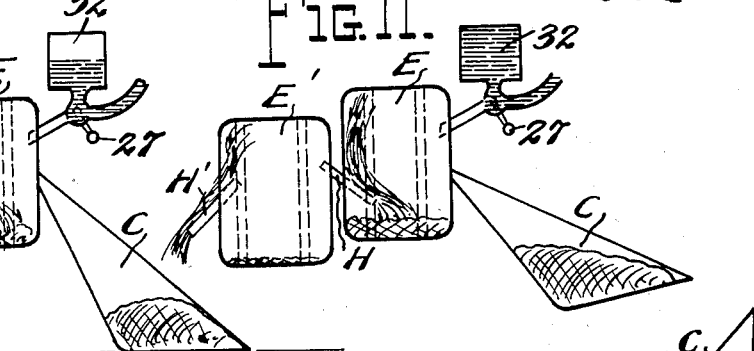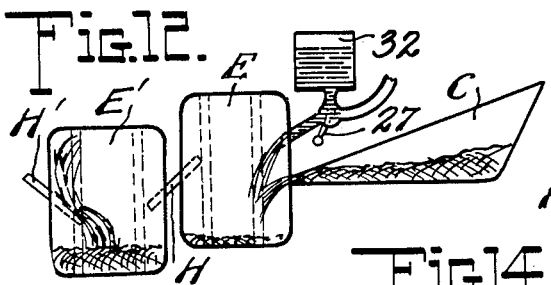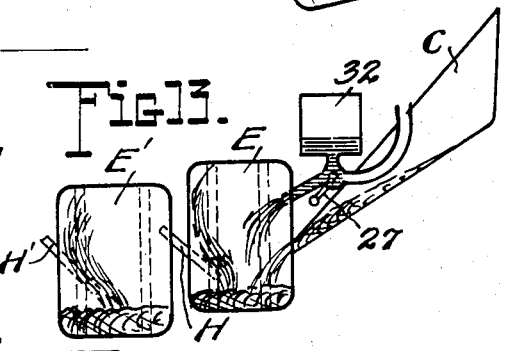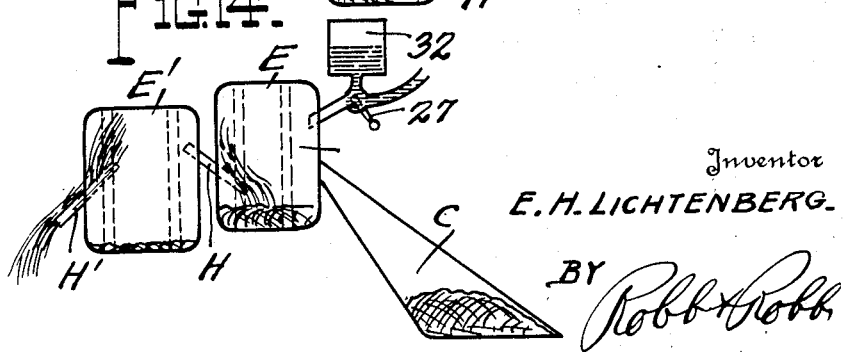

Patented June 12, 1934

1,962,960

UNITED STATES PATENT OFFICE 1,962,960

TANDEM MIXER BATCHMETER AND TIMING GEAR CONTROL

Erich H. Lichtenberg, Milwaukee, Wis., assignor to Koehring Company, Milwaukee, Wis., a corporation Application February 21, 1931, Serial No. 517,578

18 Claims. (Cl. 83—73)

This invention relates to concrete mixing machines and more particularly to that type of machine employing a plurality of mixing drums wherein the aggregates, cement and water are introduced into one of the drums and mixed therein for a predetermined period of time, after which the material is transferred to the second drum and mixed in this drum for a second predetermined period of time and subsequently discharged therefrom in proper mixed condition, the advantage of this type of mixing machine lying in the fact that the maximum output of the machine is substantially double that of the usual single drum mixer.

In a companion application, Serial No. 502,187 filed December 13, 1930, it is contemplated to provide a timing device for use with the tandem drum mixing machines which effects a synchronized control of the charging device for charging the drum, a transfer of the material from the first drum to the second drum, and the discharge of the material from the second drum. This timing device also constitutes a governing means for controlling the length of time during which the material is mixed in the drums. It is an object of that invention to entirely eliminate the batchmeter and provide a manual means for initiating the timing device into operation.

The present improvements are designed to embody in machines of the just referred to type not only a timing device for controlling and synchronizing the operation of the several parts of the machine, but to provide a batchmeter which initiates the timing device into operation.

Another object of my invention is to utilize the charging action of the charging device for the first drum to set the batchmeter so that at the end of the mixing period as controlled by the batchmeter, the batchmeter will automatically function to discharge the contents of one of the drums and simultaneously set the timing device into operation. Under these conditions, the machine would be entirely automatic in its cycle of opperation with the possible exception that the operator must lower the charging skip after it has been raised to charge the first mixing drum. In this application, as in the companion application, it is contemplated to use a power discharge unit for turning the discharge chute of each drum from discharging position. These power discharge units and the linkage connecting the same to the discharge chute are similar in construction to those disclosed in a copending application of E. Tranaas, filed December 10, 1929, Serial No. 413,029.

The batchmeter used in this application is substantially the same as that disclosed in the patent to Winkler, No. 1,451,483.

Other and further objects and advantages of the invention will be hereinafter set forth and the novel features thereof defined by the appended claims.

In the drawings:

Fig. 1 is a fragmentary side elevation of a tandem mixing machine having my invention incorporated thereon, certain of the parts being shown in more or less diagrammatic form, the water supplying mechanism being disclosed in this view as operated from the charging skip;

Fig. 2 is a similar view of a slightly modified form in which the three-way valve for controlling the mixing water is operated from the timing mechanism;

Fig. 3 is a cycle diagram disclosing the relative synchronized periods of operation of the several parts of the mixing machine;

Fig. 4 is a fragmentary detail view showing the operating connection between the timing unit and the three-way valve for supplying water to the mixing drum;

Fig. 5 is a fragmentary detail view of the operating connection between the timing unit and the several power discharge units;

Fig. 6 is an enlarged detail sectional view through one of the power discharge units disclosing its operative association with the driving gear for the timing unit;

Fig. 7 is a transverse sectional view through the driving gear;

Fig. 8 is a view similar to Fig. 7 but showing a slightly modified form of driving gear for the timing unit; and Fig. 9 is a section taken on the line 9—9 of Fig. 8.

Fig. 10 is a diagrammatic view showing the mixer under the control of the batchmeter, the discharge chute being in mixing position and aggregates being mixed within the drums;

Fig. 11 discloses the second position in the cycle of operation wherein the batchmeter has tripped off, shifting the discharge chute H' to discharging position to empty the drum E', the timing mechanism having been set into operation whereby the skip hoist clutch was engaged to initiate the charging action of the skip;

Fig. 12 discloses the next position wherein the contents of the drum E have been transferred to the drum E' and the discharge chute H' returned to mixing position, this view also disclosing the three-way valve 27 shifted to drum filling position and the aggregates being discharged from the skip C into the drum E;

Fig. 13 discloses the chute H after it has been shifted back to mixing position and the charging skip in its final position, substantially all of the aggregates and water being introduced into the drum E;

Fig. 14 is a view similar to Fig. 11 wherein the mixing period has ended and the batchmeter has caused the power discharge to turn the chute H' to drum emptying position, the water tank 32 being shown in process of filling;

Fig. 15 is a detail perspective view of the bank of control levers 25 and the actuating arms; and Fig. 16 is a fragmentary detail plan view of the drive from the shaft $M^d$, which rotates the drum E', to the power discharge unit I'.

Like reference characters refer to like parts in the several figures of the drawings.

A represents a traction support on which is mounted the frame B. The skip C is pivoted at D to the frame and is adapted in one of its positions to receive aggregates to be mixed and is elevated to discharge the aggregates into one of a pair of mixing drums E, E' which are revolvably mounted within the frame B. A boom F is pivotally supported by the frame B at the rear of the machine and carries a spreading bucket G which receives the aggregates after they have been mixed in the two drums referred to.

The drums E and E' are provided with discharge chutes, indicated generally at H and H' respectively, pivotally supported by the frame B adapted to be moved to discharging position by their respective power discharge mechanisms indicated generally at I and I'. A batchmeter J of the usual type is provided which controls the mixing period of the aggregates within the drums E and E'.

The frame B carries an engine housing K within which is located the power plant for supplying power to operate the machine. The shaft L operated by the engine carries a small pinion M meshing with a larger pinion M' forming a reduction gear for the driving shaft M" which constitutes the driving means for the mixing drum E through the instrumentalities of the pinions $M^a$ and their engagement with the ring gears carried by this drum. A pinion $M^b$ carried by the extremity of the shaft M" meshes with a pinion $M^c$ fixed to a second shaft $M^d$ constituting the driving means for the second mixing drum E' through the instrumentalities of the gears $M^e$ carried by the shaft $M^d$ and their meshing relation with the ring gears on the drum E'.

Each of the power discharge mechanisms I and I' shown in Fig. 6 is provided with a crank N carried by a shaft 17. The discharge chutes H and H' have operating linkages (not shown) which connect with these cranks and upon operation of the power discharge mechanism the crank moves the discharge chute from mixing to discharging position and vice versa. The power discharge mechanism I', as seen in Fig. 6, includes a shaft 1 which is constantly driven by the gear $1^a$ meshing with a spur pinion $M^f$ carried by the shaft $M^d$. The shaft 1 is constantly rotating and carries splined thereon a slidable clutch member 2 which is adapted to be moved into clutching engagement with a clutch 3 secured to the sleeve 4 carrying the driving worm 5. This sleeve 4 is freely journaled on the shaft 1 so that at all times when the clutch elements 2 and 3 are disengaged, rotation of the worm 5 will be prevented. The worm 5 is arranged in meshing relation with a worm gear 6 constituting the driving gear for a timing mechanism which will be later described. The power discharge unit I' is provided with a shiftable actuating rod 7, the actuation of which causes engagement of the clutch members 2 and 3 through the instrumentality of the lever $2^a$. It should be observed that when the rod 7 is moved to the right, as indicated in Fig. 6, causing engagement of the clutch members 2 and 3, the roller 8 will be moved out of the notch 9 located in the flange 10 of the worm gear 6, and after the worm 5 has caused the worm gear 6 to rotate a slight degree, the periphery of the flange 10 will prevent the clutch members 2 and 3 from again becoming disengaged until the worm gear has rotated a complete revolution, bringing the notch 9 again under the roller 8, at which time the spring 11 will rock the lever $2^a$ to cause disengagement of the clutch members 2 and 3 and thus prevent further rotation of the worm gear 6.

The power discharge chute operating mechanism and means for actuating the shaft 7 to cause the initiation into operation of the worm gear 6 will not be described in detail since this mechanism is substantially the same as that disclosed in the previously referred to co-pending Tranaas application. It should be here observed, however, that the actuation of the lever 12 is effected by the batchmeter incident to upward movement of the rod J' as the batchmeter is tripped which causes the latch bar 13 to be lowered, which rocks the bell crank release lever 14 to the right, causing the lock lug 15 thereof to release the horizontal detent 16 which is pivoted in the power discharge casing. This detent 16 normally engages the upper end of the clutch engaging lever 18 to hold the multiple disc clutch 19 out of engagement, and when the lever is released, as above described, this permits the spring 20' to cause engagement of the clutch 19, causing the gear 20 to be rotated by the clutch, the gear 20 being in meshing relation with the gear 21 carried by the shaft 17, which causes the crank N to be moved through an arc of 180°, at which time the parts of the power discharge mechanism are again normalized or shifted to the position as shown in full lines in Fig. 6. The gear 21 is provided with a cam 22 which engages the roller $7^a$ located on the end of the shaft 7 when the said gear moves through one of its semicircular arcs. In other words, the cam 22 is so arranged with respect to the crank N that when the discharge chute H' is turned to discharging position, the cam will engage the roller and cause the rod 7 to be moved to the right, thus initiating into operation the worm gear 6 previously referred to. The worm gear is mounted on a shaft 23, as seen in the drawings, on which are located a series of camming arms, indicated generally at 24, constituting a part of my timing mechanism for causing the synchronized operation of the several parts of the machine.

Located adjacent to the camming arms 24 to be actuated thereby, is a bank of pivotally mounted levers, indicated generally at 25. These levers, as seen in Fig. 1, operate the skip hoist clutch actuating lever 26 to cause the charging skip to be raised to charge the aggregates into the mixing drum E and also actuate the power discharge I for causing the discharge or transfer chute H to be moved to its different positions. As seen in Fig. 2, the bank of pivotally mounted levers 25 includes two additional operating connections, one of which leads to the three-way valve 27 for supplying mixing water to the mixing drum 1 and the other of which leads to the power discharge I' for causing this discharge to be turned back to mixing position at the proper time.

The charging skip C is provided, as seen in Fig. 1, with an abutment C' adapted to engage the end of the rod 28 for setting the batchmeter J which, as before indicated, is of the usual construction and need not be described further than to say that during the initial setting action, the rod J' is raised and locked in this raised position until the end of the mixing period as controlled by the batchmeter. When this mixing period is terminated, the internal mechanism of the batchmeter causes this rod J' to be lowered, thus rocking the lever 12 on the power discharge I', thereby setting the timing mechanism into operation and simultaneously turning the discharge chute H' for the mixing drum E' into discharging position.

Briefly describing the operation of the parts of the mechanism, as seen in Fig. 1 of the drawings, it will be assumed that both of the mixing drums E and E' are filled with the proper amount of aggregates to be mixed and the batchmeter has been set. At the end of the mixing period as governed by the batchmeter, the rod J' will be raised, causing the power discharge unit I' to be set into operation. This causes the discharge H' to be turned to discharging position, thereby discharging the contents of the mixing drum E'. Simultaneously with this operation, the rod 7 is moved to the right, rocking the lever 2ᵃ to the left and causing the clutch members 2 and 3 to be engaged. This action effects a starting of the timing mechanism incident to rotation of the worm gear 6 carried by the shaft 23.

The camming arms 24 successively contact with the actuating levers 25 to cause the discharge or transfer chute H for the mixing drum E to be tilted to discharging position with respect to this drum to cause the contents of the drum E to be transferred to the drum E'. Another of the arms 25 actuates the power discharge unit I' to cause the same to turn the discharge chute H' for the drum E' back to non-discharging or mixing position. Substantially at the same time, another of the arms 25 actuates the skip hoist clutch lever 26 to throw the skip hoist clutch 29 into engagement, which initiates the raising action of the charging skip which contains a fresh batch of aggregates to be charged into the mixing drum E.

It should now be observed that the drum E' has discharged its contents and the discharge chute thereof has been turned to non-discharging position, and the drum E has transferred its contents to the drum E'. As the skip moves to charging position, the lever 30 is actuated by the abutment C', causing the three-way valve 31 to discharge a predetermined, measured quantity of water from the tank 32 into the mixing drum along with the aggregates which are discharging from the skip C. Substantially at this time, another of the arms 25 of the now rotating timing mechanism actuates the power discharge mechanism I to turn the discharge chute H to non-discharging position. The skip upon reaching its final up-ward charging position, actuates the rod 28 to the left, setting the batchmeter, which action lowers the rod J', rocking the lever 12 to the left and thereby causing the toe 13ᵃ of the latch lever 13 to be moved up under the release angle lever 14 to lock the same and thereby prevent actuation of the power discharge unit until the end of the mixing period as determined by the batchmeter. When this mixing period ends, the rod J' will be moved upwardly, as previously described, and the cycle will be repeated, provided, of course, that the operator has lowered the skip again to its charge receiving position. In the lowering action of the skip, as controlled by the manual lever 26, the abutment C will engage the lever 33, rocking the same to actuate the connections between this lever and the three-way valve 27 so that the three-way valve will be turned to tank filling position.

Referring now briefly to Fig. 2 of the drawings, it will be observed that the levers 30 and 33 which are adapted to be actuated by the skip in its raising and lowering action for controlling the entrance of water to the mixing drum and the filling of the tank 32 are dispensed with and in place thereof a pair of levers 34 and 35, similar to those previously described with respect to the bank of levers 25, are added to this bank. Likewise, an actuating arm 24ᵃ is added to the timing mechanism so as to place the control of the three-way valve 27 under the timing mechanism rather than to provide actuation thereof by the skip itself, as is the case with the construction shown in Fig. 1. Under these conditions, it will be observed that all the operations of the mixing machine are placed under the control of the timing mechanism with the possible exception of turning of the discharge chute H' from mixing to discharging position, which in every instance shown in the drawings is accomplished through the batchmeter J. Therefore, when the timing mechanism is set into timing operation, as shown in Figs. 2 and 4, the actuating arm 24ᵃ at the proper time will rock the lever 34, thereby shifting the connection 36 to the three-way valve and actuating the three-way valve to turn the same to discharging position. Further rotation of the actuating arm will subsequently actuate the lever 35 to thereby move the connection 36 in the opposite direction to effect a shift of the three-way valve 27 from tank discharging to tank filling position.

Referring briefly to Fig. 5, it should be observed that in this form of the invention the actuating connections from the mechanisms I and I' as well as the actuating connection for the skip hoist lever 26, are designed to be actuated by a single actuating lever 25ᵃ, and under these conditions, the two power discharge mechanisms and the skip hoist lever will be actuated simultaneously.

In the preferred form of my invention, I disclose the flange 10 of the worm gear 6 as an integral part of the gear, while in Fig. 8, I propose to provide a separate disc 10ᵃ keyed to the timing shaft 23, this disc being provided with a notch 9ᵃ for the reception of the roller 8 to permit the lever 2ᵃ to rock and disengage the clutch members 2 and 3 after the worm gear 6 of the timing mechanism has made one complete revolution.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a mixing machine of the class described, a support, a plurality of mixing drums carried thereby, a charging device for one of said drums, a discharging device for said drum constituting a transfer device for transferring the contents of said drum to the other drum, a discharge device for the second drum, a timing device operatively associated with said charging, transferring and discharging devices to initiate the operation of said devices in their desired sequence, and a batchmeter for initiating the said timing device into operation.

2. In a mixing machine of the class described, a support, a plurality of mixing drums carried thereby, a charging device for one of said drums, a discharging device for said drum constituting a transfer device for transferring the contents of said drum to the other drum, a discharge device for the second drum, a timing device operatively associated with said charging, transferring and discharging devices to initiate the operation of said devices in their desired sequence, a batchmeter for initiating the said discharging device into operation, means operable from the discharging device to set the timing device into operation and means operable from the charging device to set the batchmeter for subsequent control of the discharging device.

3. In a mixing machine of the class described, a supporting framework, a plurality of mixing drums carried thereby, charging means for charging aggregates to be mixed into one of said drums, discharging transfer means for one of said drums, said discharging transfer means constituting charging means for the second drum, discharging means for the second drum, power operated mechanisms for operating said charging and discharging means, a power operated timing mechanism for initiating into operation in proper sequence the said power operated mechanisms for the charging and discharging means, a batchmeter for controlling the mixing period of the aggregates within said drums, operative connections between the batchmeter and one of the power operated mechanisms to cause the same to be initiated into operation by the batchmeter at the end of the mixing period as controlled by said batchmeter and means to set the timing mechanism into operation from the last mentioned power operated mechanism.

4. In a concrete mixing machine, a plurality of mixing drums, charging means for introducing material to be mixed into one of said drums, a discharge chute for said drum constituting charging means for the second drum, a discharge chute for the second drum, a power discharge mechanism for each discharge chute, each mechanism being adapted to move its respective discharge chute into and from discharging position, a power operated timing device for setting the power discharge mechanisms into operation, and a batchmeter adapted to control the mixing period of the aggregates to be mixed within the mixing drums, said batchmeter being operatively associated with the power discharge mechanism for the discharge chute for the second drum so as to initiate the operation of said timing mechanism through said last named mechanism.

5. In a mixing machine of the class described, a support, a plurality of mixing drums carried thereby, charging means for one of said drums, discharging means for the other drum, transfer means between said drums shiftable to transferring and non-transferring position, power operated mechanisms for actuating said charging, discharging and transferring mechanisms, a power operated timing device for initiating said power operated mechanism into operation, said power operated mechanism for the discharge means under certain conditions being adapted to initiate said timing mechanism into operation, and a batchmeter associated with the last named power operated mechanism to initiate said power operated mechanism into operation under these conditions.

6. In a mixing machine of the class described, a support, a plurality of mixing drums carried thereby, charging means for one of said drums, discharging means for the other drum, transfer means between said drums shiftable to transferring and non-transferring position, power operated mechanisms for actuating said charging, discharging and transferring mechanisms, a power operated timing device for initiating said power operated mechanisms into operation in a predetermined synchronized cycle, said power operated mechanism for the discharging means under certain conditions being adapted to initiate said timing mechanism into operation, a batchmeter associated with the last named power operated mechanism to initiate said power operated mechanism into operation under these conditions, and means for setting the batchmeter from the charging means.

7. In a concrete mixing machine of the class described, a support, a plurality of mixing elements carried thereby, a charging device for one of said elements, a discharging device for one of said elements, a transfer device between said elements, power operated mechanisms for causing charging action of the charging device, transferring and non-transferring actions of the transfer device, and discharging and non-discharging action of the discharging device, a batchmeter associated with the last named power operated mechanism adapted to initiate the same into operation to turn the discharge device to discharging position, a timing mechanism associated with the last named power operated mechanism to be initiated into operation thereby including a bank of levers having actuating connections between the charging, transfer and discharging devices, and a plurality of camming arms adapted to actuate said levers in predetermined desired sequence to shift the said actuating connections to cause the charging, transfer and discharging devices to be operated by the power operated mechanisms in the desired sequence.

8. In concrete mixing machines, a plurality of mixing drums, charging means for introducing materials to be mixed into one of said drums, a discharge chute for said drum constituting charging means for the second drum, a power discharge chute operating mechanism for each discharge chute being adapted to move its respective discharge chute into and out of discharging position, a power operated timing mechanism for setting the power discharge mechanisms into operation to move one of the discharge chutes into discharging position and the other chutes into non-discharging position, and a batchmeter adapted to control the mixing period of the aggregates within the drums when the chutes are in non-discharging position, said batchmeter being operatively connected with the power discharge mechanism for the second drum to cause operation thereof to turn discharge chute to discharging position and through said mechanism to the timing mechanism and adapted to cause movement of the discharge chute of the second drum to discharging position and to cause initiation of the operation of the timing mechanism.

9. In a concrete mixing machine, a mixing drum, a charging skip, power means for moving the skip to charging position to charge the drum with the aggregates to be mixed, a discharge chute for emptying the drum, a power discharge mechanism for shifting the discharge chute to discharging and non-discharging positions, a batchmeter arranged to be set by the skip during its charging action, a timing mechanism associated with the power means for the skip and the power discharge mechanism to initiate said mechanisms into operation to cause charging action of the skip and turning of the discharge chute to non-discharging position, an operating connection between said power discharge and said timing mechanism to initiate a timing mechanism into operation upon operation of the power discharge to turn the discharge chute to discharging position and an operating connection between the batchmeter and the power discharge arranged to be actuated by the batchmeter to set the power discharge into operation to turn the discharge chute from non-discharging to discharging position.

10. In a concrete mixing machine, a mixing drum, a charging device therefor, a discharging device therefor shiftable to discharging and non-discharging positions, a power discharge operating means for moving said discharge device to said positions, a power operated timing device for initiating the charging and discharging devices into operation in a predetermined sequence, an operating connection between the power discharge operating means and the timing device for setting the timing device into operation from the power discharge operating means, a batchmeter, means for setting the batchmeter from the charging device and means for controlling the operation of the discharge device operating means alternately from the batchmeter and from the timing device.

11. In a concrete mixing machine, a mixing drum, a charging device therefor, a discharging device therefor shiftable to discharging and non-discharging positions, a power discharge for shifting said discharging device to said positions, a timing device controlling the operation of the charging and discharging devices arranged to be set into operation by the power discharging device, and a batchmeter operable by the charging device to be set thereby, means to control the operation of the power discharge from said batchmeter.

12. In a concrete mixing machine, a mixing drum, a discharge device therefor movable to discharging and non-discharging positions, operating means for moving said discharge device to said positions, a timing device for controlling the operation of the discharging device, means to cause operation of the timing device from the discharge device operating means, a batchmeter, means for setting the batchmeter, and means to control the operation of the discharge device alternately from the batchmeter and the timing device.

13. In a concrete mixing machine of the class described, a plurality of mixing chambers, a charging device for one of said chambers, a discharging device for the other chamber, and a transfer device between the chambers movable to transferring and non-transferring positions, separate power actuated devices for operating the charging, transferring and discharging devices, a power operated timing device for controlling the operation of the separate power operated devices adapted to be set into operation by one of the power operated devices and a batchmeter for controlling the operation of the last mentioned power operated device.

14. In a concrete mixing machine of the class described, a plurality of mixing chambers, a charging device for one of said chambers, a discharging device for the other chamber, a transfer device between the chambers, separate power operated devices for the charging, transferring and discharging devices, said power operated device including a rotary member having a discharge device operating crank actuated by the rotary member, a cam member operable by said rotary member, a shiftable part actuated by the cam, a timing device including a constantly driven member arranged to drive the rotary member aforesaid, a second rotary member arranged to be driven by the constantly driven member, a clutch actuated by the shiftable part aforesaid for establishing a driving connection between the constantly driven member and the second rotary member, a shaft adapted to be driven by the second rotary member, cam levers arranged to be actuated in a predetermined sequence by said last mentioned shaft, operating connections between the said camming levers and the power actuated devices for the charging, transferring and discharging devices to cause operation thereof in a predetermined sequence, a batchmeter for controlling the discharge operation of the power operating device for the discharge device, and means to set the batchmeter from the charging device.

15. In a mixing machine of the class described, a support, a plurality of mixing drums carried thereby, a charging device for one of said drums, a transfer device for transferring the contents of said drum to the other drum, a discharge device for the second drum, a timing device operatively connected with the charging, transferring and discharging devices aforesaid to initiate the operation of said devices in their desired sequence, a batchmeter operable from said charging device to actuate said discharge device, and an operating connection between said discharge device and said timing device to initiate said timing device into operation from said discharge device.

16. In a mixing machine, a support, a plurality of mixing drums carried thereby, a charging device for one of said drums, a transfer device for transferring the contents of said drum to the other drum, a discharge device for the second drum, a timing device operatively associated with said charging, transferring and discharge devices, means for initiating said timing device into operation from said discharge device and a batchmeter for controlling the operation of said discharge device.

17. In a concrete mixing machine, a support, a plurality of mixing drums carried thereby, a batchmeter, a power operated timing device, a power operated device for initiating said timing device into operation, means for initiating into operation said power operated device from said batchmeter, a transfer device for transferring the contents of one of the drums to the other drum and operatively connected with said timing device and initiated into operation thereby.

18. In concrete mixing machines, a plurality of mixing drums, charging means for introducing materials to be mixed into one of said drums, a discharge chute for said drum constituting charging means for the second drum, a power discharge chute operating mechanism for each discharge chute being adapted to move its respective discharge chute into and out of discharging position, a power operated timing mechanism for setting the power discharge mechanisms into operation to move one of the discharge chutes into discharging position and the other chute into non-discharging position, and a batchmeter adapted to control the mixing period of the aggregates within the drums when the chutes are in non-discharging position, said batchmeter being operatively connected with the power discharge mechanism for the second drum to cause operation thereof to turn the discharge chute to discharging position and through said mechanism to the timing mechanism to cause initiation of the operation of the timing mechanism.

ERICH H. LICHTENBERG.